United States Patent [19]

Fillaud et al.

[11] Patent Number: 4,911,935
[45] Date of Patent: Mar. 27, 1990

[54] METHOD OF PROCESSING A CHEESE-BASED FOOD PRODUCT AND THE CHEESE-BASED FOOD PRODUCT THUS OBTAINED

[75] Inventors: Catherine M. Fillaud, Neufchateau; Bernard J. Y. Fromage, Saint-Thiebaud, both of France

[73] Assignee: Bongrain S.A., Guyancourt, France

[21] Appl. No.: 10,168

[22] PCT Filed: May 12, 1986

[86] PCT No.: PCT/FR86/00162
§ 371 Date: Mar. 6, 1987
§ 102(e) Date: Mar. 6, 1987

[87] PCT Pub. No.: WO86/06588
PCT Pub. Date: Nov. 20, 1986

[30] Foreign Application Priority Data

May 10, 1985 [FR] France ............................. 85 07155

[51] Int. Cl.[4] .................... A23C 19/00; A23C 19/16
[52] U.S. Cl. ........................................ 426/36; 426/8; 426/89; 426/130; 426/302; 426/307; 426/582; 426/411; 426/415; 426/250

[58] Field of Search ............... 426/8, 36, 37, 90, 38, 426/89, 130, 582, 293, 250, 302, 305, 415, 138

[56] References Cited

U.S. PATENT DOCUMENTS 4,504,502 3/1985 Earle et al. ......................... 426/305
4,627,984 12/1986 Authelet et al. .................... 426/130

FOREIGN PATENT DOCUMENTS 0033635 8/1981 European Pat. Off. .
0048123 3/1982 European Pat. Off. .

Primary Examiner—Marianne Cintins
Attorney, Agent, or Firm—Kenyon & Kenyon

[57] ABSTRACT

A mass of cheese which is not mature or only slightly mature, and excluding processed cheese, is provided with a semi-permeable outer envelope wherein the envelope is a food gel selected to regulate the exchange of elements such as enzymes, ions, gas, salts and amino acids between the interior and exterior of the mass of cheese for the purpose of obtaining controlled maturing of the cheese product and prolonging its life.

38 Claims, 1 Drawing Sheet

U.S. Patent
Mar. 27, 1990
4,911,935
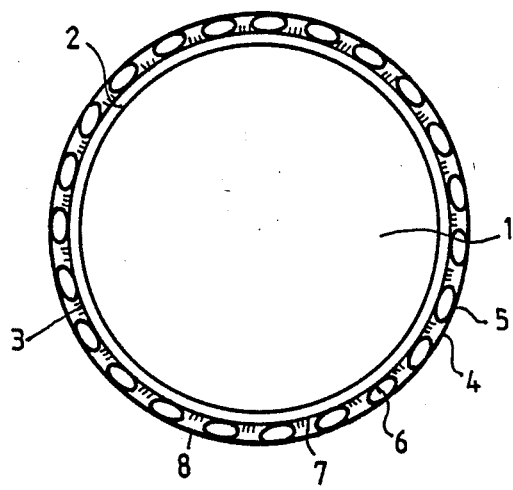
FIG. 1
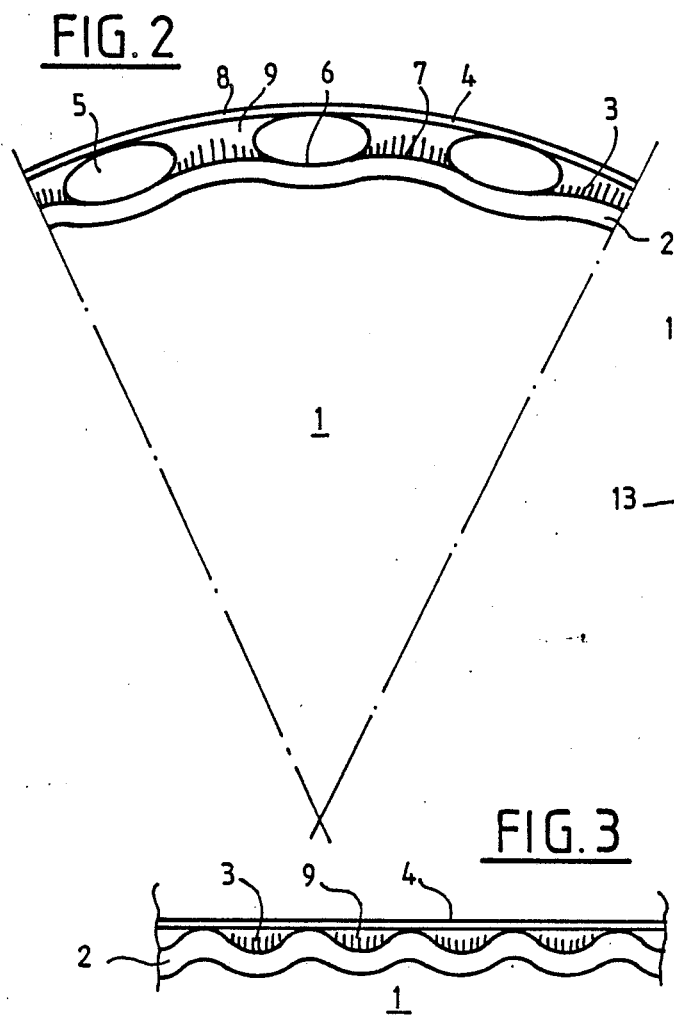
FIG. 2
FIG. 3
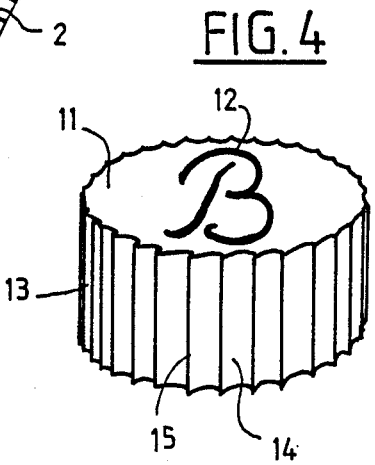
FIG. 4

METHOD OF PROCESSING A CHEESE-BASED FOOD PRODUCT AND THE CHEESE-BASED FOOD PRODUCT THUS OBTAINED

The invention relates to a method of processing a cheese-based food product, the resulting food product and packaging for implementing the method.

As is known, the cheese industry normally classifies cheeses in a number of main groups differing from one another with regard to the general type of cheese and the method of manufacture. The main groups are: fresh cheeses, soft cheeses (with a washed rind or rind containing flora), blue cheeses, non-cooked pressed cheeses, cooked pressed cheeses, and goat's cheese. In addition to these traditional groups there is the very special group of processed cheese, obtained from cooked or non-cooked pressed cheese and, if required, additives, after undergoing very specific melting treatment at a temperature of at least 75° C. in the presence of melting salts or other technological additives. The methods of manufacture vary widely, even within the conventional groups. The curds in the products, before maturing if required has characteristics which vary widely, inter alia a dry extract between about 25% and more than 75%.

As is known, the conventional groups of cheeses are difficult to preserve. To solve this problem, it has been proposed to use processed cheeses, which are in the form of a long-lasting gel without a rind. However, processed cheeses are very different from traditional cheeses with regard to their texture, consistency, presentation (usually packed in portions in metal foil, grouped in a box), their use (inter alia for spreading on bread), their consumers (mainly children) and particularly their taste (which is often very different from that of the cheese use as a raw material).

One development of the traditional method of soft cheese manufacture is described in French Patent Specification 1437562, which discloses the presence of a separate artificial envelope which is removable so that the user can eat cheese without a rind, which is considered as a disadvantage to be avoided.

The very specific method of manufacturing processed cheese has been the subject of numerous developments of its own, inter alia European Patent Specification 33635 and French Specifications 2382196, 104483 and 1301264. As previously stated, the processed cheese technique is different and even opposite to that of the traditional cheeses previously mentioned. According to European PS 33635, processed cheese is placed in a mould and then impermeable barrier is placed on its uncovered top surface so as to prevent any interaction between the processed cheese and micro-organisms sprayed onto the exposed upper surface, which grow when the mould is sealed in substantially hermetic manner.

One object of the invention is to propose a cheese which is substantially of traditional type, i.e. does not contain processed cheese, which may or may not be matured and is preferably soft and has a greatly increased shelf life.

Another aim of the invention is to provide a cheese of the aforementioned kind where the maturing process is controlled so that the product has a novel, attractive texture.

Another aim of the invention is to propose a cheese having a novel, attractive external presentation and a consumable outer layer (or rind).

To this end, the invention proposes, firstly, a food product comprising a mass of cheese which originally is not or only slightly matured, excluding processed cheeses, and also comprising a substantially semi-permeable external envelope associated with, on and all round the mass of cheese and comprising a food gel adapted to regulate exchanges of elements (inter alia enzymes, ion, gas, salts, amino acids etc.) from the mass of cheese towards the exterior and in the opposite direction, for the purpose of controlling the maturation of the product and simultaneously prolonging its life.

The invention also proposes a method of processing an aforementioned food product, comprising the following steps:

(1) A mass of cheese which is not or only slightly matured is covered by a substantially semi-permeable outer envelope made of a food gel;

(2) Surface ferments for growing external surface flora corresponding to the desired taste and chosen inter alia from species of penicillium are placed on the outer surface of the gel, and (3) Packaging is placed round the external envelope and is adapted to allow controlled gradual growth of external flora on the surface of the product and also to allow controlled maturing of the mass of cheese so as to prolong its life.

Finally the invention proposes packaging for implementing the method, comprising at least one inter alia flexible internal layer, the entire layer being pressed onto the product and adapted to form masked areas where the product—inter alia the outer envelope—is in contact with the layer and free areas enabling external surface flora to grow whereas the masked areas prevent growth, the free areas with flora being combined with the masked areas without flora so as to limit the growth of surface flora and also control the maturing of the product and prolong its life.

The invention is therefore used to treat traditional-type (not processed) cheese so as to control maturation and prolong its life.

The invention thus solves the problem of processing a "living" developing product (in contrast to a "dead" non-developing product such as processed cheese which is not affected by this problem) so that it matures but sufficiently slowly for the product to keep its organoleptic properties and also have an increased life.

The invention has been used to obtain soft cheese having a life prolonged by 20 to 40 days, though the cheese matured in satisfactory manner.

The invention has also obtained this surprising result with a consumable rind and a completely novel external appearance, inter alia comprising a series of areas with flora and inter alia white in colour and areas having a different colour (inter alia orange) and without flora.

The invention will be more clearly understood from the following description with reference to the accompanying drawings in which:

FIG. 1 is a diagram in section of one possible embodiment of a food product according to the invention;

FIG. 2 is a partial diagrammatic view of FIG. 1 on a larger scale;

FIG. 3 is a partial diagrammatic view in section of another possible embodiment of the food product according to the invention, and FIG. 4 is a diagrammatic perspective view of the matured product without packaging.

The invention relates to a method of processing a cheese-based food product, the resulting cheese-based food product and the packaging for implementing the method.

The food product comprises a mass of cheese 1 which is originally not or only slightly matured. The cheese is preferably soft cheese in which the proportion of fat to dry material is between about 25% and 75%. Further, the invention also applies to other kinds of developing cheeses but does not include processed cheese, which are non-developing by nature. The invention consequently applies also to blue cheese, i.e. cheese containing penicillium of the species penicillium roqueforti or any other soft or pressed or semi-pressed cheeses.

A substantially semi-permeable outer envelope 2 made of a food gel is associated with, on and all round the mass of cheese 1. Envelope 2 is mainly for the purpose of regulating exchanges of elements (inter alia enzymes, ion, gas, salts amino acids, etc.) from the mass of cheese 1 towards the exterior and in the opposite direction, for the purpose of bringing about controlled maturing of the product and simultaneously prolonging its life.

The aforementioned outer medium, with respect to which the envelope 2 is a semi-permeable barrier, comprises the external atmosphere in contact with the product and external surface flora 3 growing on the outer envelope 2, as will be described hereinafter.

The exchanges of elements between the mass of cheese 1 and the exterior are complex with regard to the nature of the migrating elements and the direction of migration. However, the semi-permeable element 2 can be used to regulate these exchanges in advantageous manner. Inter alia, envelope 2 allows some migration of water and amino acids from the mass of cheese 1 towards the exterior so that mass 1 can be matured at a lower speed. Envelope 2 also allows some oxygen to flow from the exterior towards the interior.

Envelope 2 also serves as a substrate for external surface flora 3 corresponding to the desired taste. The result, in combination with the semi-permeability of envelope 2, is that the maturing of the product is improved by the presence of the surface flora 3, but the flora 3 do not reduce the life of the product through rapid degradation of mass 1.

Envelope 2 also constitutes a substrate for a suitable nutrient medium for the external surface flora 3 The medium may e.g. be a product chosen from the group formed by glucose, tryptone, yeast extracts, sodium chloride or any eqquivalent substance.

In a first variant, the gel forming envelope 2 is an aqueous solution of at least one compound chosen from the group formed by alginates and carragheenates. These compounds are low in the substance essential for proper growth of surface micro-organisms. In this variant, therefore, sources of carbon and nitrogen are added to ensure good growth of flora 3.

In a second possible embodiment, the gel is an aqueous solution comprising food proteins such as gelatine, which do not require any external additives for growth of external flora 3.

In both cases, envelope 2 normally has good water retention.

According to one feature of the invention, the food product also comprises packaging 4 containing at least one flexible internal layer 5, the entire layer being pressed onto the product and adapted to form masked areas 6 and free areas 7.

The masked areas 6 are areas where layer 5 is in contact with the product, inter alia with its outer envelope 2. The free areas 7 are the other areas where the inner layer 5 has perforations (as in the first variant in FIGS. 1 and 2) or is moved away from the food product (second variant in FIG. 3). The free areas 7 allow growth of external surface flora 3, whereas the masked areas 6 prevent this growth. The free areas 7 with flora combined with the masked areas 6 without flora limit the growth of surface flora 3 and thus, in combination with the semi-permeable envelope 2, control the maturing of the product and prolong its life.

Packaging 4 also preferably comprises in combination at least one flexible external layer 8 which is very permeable to oxygen and slightly permeable to water-vapour and is pressed onto the inner layer 5 so that the free areas 7 have a high moisture content facilitating the growth of surface flora 3.

The external flora are obtained e.g. from penicillium, inter alia penicillium candidum.

Micro-organisms enabling external surface flora 3 to grow or giving the product a certain taste, grow on or in evelope 2.

Envelope 2 is in itself a barrier semi-permeable to oxygen. This effect can be accentuated, in which case envelope 2 will also constitute a substrate for an anti-oxidising product which helps to control maturing and prolongs the life of the product.

An anti-oxidising product is chosen from the group comprising carotenoids, ascorbic acid, citric acids, tocopherols and other food substances having an anti-oxidising effect.

According to another feature, envelope 2 also constitutes a substrate for a food dye.

According to another characteristic, evelope 2 also constitutes a substrate for additional bacteria and/or micro-organisms acting on the mass of cheese 1 to give it a special taste. The bacteria may e.g. be bacterium linens.

Envelope 2 has a thickness of about 0.5 to 1.5 mm to obtain the desired semi-permeability, depending on the nature of the envelope.

Layer 5 has a certain thickness, inter alia from about 2 to 4 mm, so as to produce spaces 9 for growth of surface flora 3 in the free areas 7.

Preferably the masked zones 6 and free zones 7 are at least partially distributed in an at least substantially regular manner, either following the shape of the inner layer 5 (first variant in FIG. 2) or at random along the areas of contact between the inner layer 5 and the product (second variant) of FIG. 3.

The inner layer 5 can have various embodiments. It can comprise a sheet in the general form of flakes made up from separate elements (FIG. 2) or can be corrugated so as reliably to produce spaced-apart areas of contact between layer 5 and the product (not shown). Alternatively layer 5 can be a continuous sheet, in which case the areas of contact between the product and the areas where there is no contact result from the irregular and not completely smooth shape of the product.

The free areas 7 can make up between about 15 and 60% of the total external area of the product.

The dye comprises at least one organge carotenoid. Other dyes can be used provided they are of food grade.

The outer layer 6 of packaging 4 is made from a film of polyethylene or polypropylene or any equivalent material having the previously-mentioned permeability to oxygen and impermeability to water-vapour.

The packaging, inter alia the inner layer 5, can be designed so that the masked areas 6 and free areas 7 form decorative designs on the product.

The product, once removed from its packaging 4, can be shaped substantially as in FIG. 1, in which case the product has a substantially cylindrical shape. One circular end face 11 is given a decorative design 12 such as a letter or any design, by means of masked areas 6 and free areas 7 suitably defined in the packaging and a dye incorporated in envelope 2. The cylindrical side surface 13 can have grooves or hollows 14 between axial projections 15, the projections 15 corresponding to the free areas 7 and the hollows 14 corresponding to the masked areas 6. The resulting hollows 14 will be orange if a dye such as a carotenoid is incorporated in envelope 2, whereas projections 15 will be white if seeded with penicillium camemberti.

Of course other embodiments are possible.

The invention also relates to a method of processing a food product comprising a mass of cheese 1 which originally has been not or only slightly matured, i.e. excluding processed cheese. According to the method, the mass of cheese is covered by a substantially semi-permeable outer envelope 2 made of a food gel, after which surface ferments are placed on the outer surface of envelope 2 so as to bring about growth of external surface flora 3 corresponding to the desired taste of the product and chosen inter alia from species of penicillium. Finally, envelope 2 is surrounded by packaging permitting controlled gradual growth of external flora 3 on the surface of the product, together with controlled maturing of mass 1 so as to increase its life.

In a first variant, the gel for forming the envelope 2 is prepared by dissolving 5 to 50 g/l carragheenanes or alginates, 5 to 5 g/l tryptone, 0.5 to 3 g/l glucose and 1 to 5 g/l yeast extract in water.

In a second variant, the gel is prepared by dissolving 50 to 400 g/l gelatine in water.

The mass of cheese 1 is coated with the external envelope 2 as follows: the gel is prepared as previously mentioned and brought to a temperature of the order of 30° to 75° C. to make it liquid or viscous. The gel is then evaporated in the aforementioned consistency onto the mass of cheese 1, or alternatively cheese 1 is immersed in the gel and the gel is left to solidify, inter alia at or near ambient temperature.

In one variant, the mass of cheese is coated with gel to form the outer envelope 2 after pickling followed by primary maturing of cheese 1 for a period lasting from a few hours to a few days.

Depending on requirements and in accordance with the preceding, the following are added to the gel during preparation; a nutrient medium suitable for the surface ferments and choose inter alia from the group made up of glucose, tryptone, yeast extracts and sodium chloride and/or an oxidising product chosen inter alia from the group made up of carotenoids, ascorbic acid, citric acid, tocopherols and food substances having an anti-oxidising effect and/or bacteria and/or micro-organisms, inter alia bacterium linens, to give a special taste to the cheese, and/or a food dye inter alia a carotenoid.

Preferably the surface ferments are supplied as soon as the gel solidifies and over the entire outer surface of the product, inter alia by evaporation.

Preferably the packaging is placed over the entire outer envelope 2 after secondary maturing of the product for a period of a few hours to a few days, inter alia two days.

The packaging 4 is placed on the product as follows: a first inner layer 5 is applied so as to form masked areas 6 and free areas 7, followed by a second outer layer 8 which is very permeable to oxygen and slightly permeable to water-vapour.

Finally the invention relates to packaging 4 for a food product of the previously-described kind, i.e. comprising a mass of cheese which originally has been not or only slightly matured, i.e. excluding processed cheese. The packaging comprises at least one flexible inner layer 5, the entire layer being adapted to be pressed onto the product and serving to form masked areas where the product, inter alia the outer envelope 2, is in contact with the inner layer 6 and other, free areas 7 which allow external surface flora 3 to grow whereas the masked areas 6 prevent such growth, the free areas 7 with flora combining with the masked areas 6 without flora so as to limit the growth of surface flora 3 and thus also control the maturing of the product and prolong its life. The packaging according to the invention, not only serves the general purpose of mechanically protecting the product but also participates actively within the maturing process.

As previously stated, the inner layer 5 preferably has a certain thickness, inter alia of the order of 2 to 4 mm, so as to produce spaces 9 for growth of surface flora 3 in the free areas 7. Layer 5 may e.g. be a sheet having a generally flaky sheet shape made up of separate elements, or may be corrugated or may be a continuous sheet having some areas in contact with the product and other areas at a distance therefrom as a result of the irregular, rough surface of the product. The advantage of the flaky variant layer 5 is that the constituent components of the layer have some transverse flexibility which gives effective mechanical protection to the food product.

In the masked areas, the inner layer 5 is in contact with the food product and prevents the growth of external flora 3, though such growth is possible in the free areas 7. To facilitate growth, the packaging also comprises at least one flexible outer layer 8 which is very permeable to oxygen and slightly permeable to water vapour and is pressed onto the inner layer 5 so as to obtain a high moisture content in the free areas 7. Layer 5 can be made e.g. of polyethylene or polypropylene or any equivalent material.

We claim:
1. A food product comprising:
   a mass of cheese having an exterior surface, said mass of cheese being originally at most slightly matured and excluding processed cheese;
   a substantially semi-permeable external envelope disposed on and covering the exterior surface of said mass of cheese;
   said semi-permeable envelope comprising a food gel selected to permit and regulate exchange of elements from the group consisting of enzymes, ions, gas, salts, and amino acids from the interior of said mass of cheese to the exterior thereof and from the exterior of said mass of cheese in to the interior thereof through said semi-permeable envelope whereby maturing of said cheese is controlled and its life simultaneously prolonged.

2. A food product according to claim 1 wherein an external surface flora is disposed on said semi-permeable envelope, said surface flora being selected to correspond to a predetermined taste, said surface flora cooperating with said semi-permeable envelope to improve the maturing of said cheese without rapid degradation of the life of said cheese.

3. A food product according to claim 2 wherein a preselected nutrient medium for said external surface flora is disposed on said semi-permeable envelope.

4. A food product according to claim 3 wherein said nutrient medium is selected from the group consisting of glucose, tryptone, yeast extracts and sodium chloride.

5. A food product according to claim 1 wherein said food gel is an aqueous solution of at least one compound selected from the group consisting of alginates, carragheenanes, gelatine, food proteins, and mixtures thereof.

6. A food product according to claim 2 further including a packaging comprising:
at least one internal flexible layer pressed onto said semi-permeable envelope at spaced apart intervals defining masked areas where said flexible layer is pressed into contact with said semi-permeable envelope and intervening free areas, said free areas permitting growth of said surface flora and said masked areas preventing growth of said surface flora, whereby said masked areas, said free areas, and said semi-permeable envelope cooperate to control the maturing of said cheese.

7. A food product according to claim 6 wherein said packaging further comprises an external layer made from a material very permeable to oxygen and slightly permeable to water vapor, said external layer being pressed onto said internal layer whereby said free areas contain moisture promoting growth of said flora.

8. A food product according to claim 3 wherein said external surface flora is obtained from penicillium candidum.

9. A food product according to claim 6 further comprising an anti-oxidizing agent disposed on said semi-permeable envelope.

10. A food product according to claim 6 further comprising a food dye disposed on said semi-permeable envelope.

11. A food product according to claim 6 further comprising a member selected from the group consisting of bacteria, micro-organisms, and mixtures thereof disposed on said semi-permeable envelope, said member acting on said cheese through said semi-permeable membrane to affect taste.

12. A food product according to claim 11 wherein said bacteria are bacterium linens.

13. A food product according to claim 6 wherein said semi-permeable membrane has a thickness of about 0.5 to 1.5 mm.

14. A food product according to claim 6 wherein said cheese is soft type cheese having proportion of fat to dry substance between about 25% to 75%.

15. A food product according to claim 6 wherein said inner flexible layer of said packaging has a thickness of about 2 to 4 mm.

16. A food product according to claim 6 wherein said masked areas and said free areas are at least partially distributed in a substantially regular manner.

17. A food product according to claim 6 wherein said internal flexible layer is a member selected from the group consisting of corrugated material and separated flakes.

18. A food product according to claim 6 wherein said free areas comprise approximately 15% to 60% of the surface of said semi-permeable envelope.

19. A food product according to claim 10 wherein said food dye comprises at least one carotenoid.

20. A food product according to claim 7 wherein said external packaging layer is a film made from a material selected from the group consisting of polyethylene and polypropylene.

21. A method for processing a food product comprising:
providing a mass of cheese which originally at most has been only slightly matured and excluding processed cheese;
coating said mass of cheese with a semi-permeable envelope made from a food gel;
providing surface ferments on said semi-permeable envelope for growing external surface flora, said surface ferments being selected to provide a predetermined taste;
placing a packaging around said semi-permeable envelope, said packaging being pressed into contact with said semi-permeable envelope at spaced apart intervals thereby defining masked areas where said packaging is pressed into contact with said semi-permeable envelope and intervening free areas thereby permitting surface flora growth in said free areas and preventing surface flora growth in said masked areas;
thereby controlling maturing of said cheese by cooperation of said semi-permeable membrane, said surface flora growth, and said prevented surface flora growth.

22. A method according to claim 21 wherein said coating step further includes preparing said gel by dissolving in water 5 to 50 g/l carragheenane, 2 to 5 g/l tryptone, 0.5 to 3 g/l glucose, and 1 to 5 g/l yeast extract.

23. A method according to claim 21 wherein said coating step further includes preparing said gel by dissolving in water 50 to 400 g/l gelatine.

24. A method according to claim 21 wherein said coating step further includes heating said gel to a temperature of about 30° C. to 75° C. and then evaporating said heated gel onto the mass of cheese.

25. A method according to claim 21 wherein said coating step further includes heating said gel to a temperature of about 30° C. to 75° C., then dipping said mass of cheese into said gel, and then permitting said gel to solidify.

26. A method according to claim 21 wherein prior to said coating step said method further comprises pickling said mass of cheese followed by primary maturing of said mass of cheese for a time between a few hours and a few days.

27. A method according to claim 21 comprising adding a surface ferment nutrient material to said gel, said nutrient material being selected from the group consisting of glucose, tryptones, yeast extracts and sodium chloride.

28. A method product according to claim 21 comprising adding an anti-oxidizing agent to said gel, said anti-oxidizing agent being selected from the group consisting of carotenoids, ascorbic acid, citric acid, and tocopherols.

29. A method according to claim 21 comprising adding to said gel a member selected from the group consisting of bacteria and micro-organisms.

30. A method according to claim 21 comprising adding to said gel a food dye.

31. A method according to claim 25 comprising depositing surface ferments on said semi-permeable envelope as soon as said gel solidifies.

32. A method according to claim 26 wherein prior to placing said packaging around said semi-permeable membrane, permitting secondary maturing of said cheese for a time between a few hours to a few days.

33. A method according to claim 21 wherein said packaging step comprises applying a first internal layer around said semi-permeable membrane to define said masked areas and said free areas and applying a second external layer formed from a material which is very permeable to oxygen and slightly permeable to water vapor.

34. A packaged food product comprising:
a mass of cheese having an exterior surface, said mass of cheese being originally at most slightly matured and excluding processed cheese;
a substantially semi-permeable envelope disposed on and covering said exterior surface of said cheese, said semi-permeable envelope comprising a food gel;
a packaging material pressed onto said semi-permeable envelope at spaced apart intervals defining masked areas where said packaging material is pressed into contact with said semi-permeable envelope and intervening free areas; and
surface flora disposed on said semi-permeable envelope within said free areas, said surface flora being selected to correspond to a predetermined taste.

35. A packaged food product according to claim 34 wherein said packaging material comprises an internal layer pressed against said semi-permeable membrane defining said free and said masked areas, and an external layer made from a material very permeable to oxygen and slightly permeable to water vapor.

36. A packaged food product according to claim 35 wherein said internal layer is a member selected from the group consisting of corrugated material and separated flakes.

37. A packaged food product according to claim 35 wherein said external layer is a film made from a material selected from the group consisting of polyethylene and polypropylene.

38. A packaged food product according to claim 34 wherein said masked areas and said free areas are at least partially distributed in a substantially regular manner.

* * * * *